(12) United States Patent
Barroso et al.

(10) Patent No.: US 10,127,076 B1
(45) Date of Patent: *Nov. 13, 2018

(54) LOW LATENCY THREAD CONTEXT CACHING

(71) Applicant: Google LLC, Mountain View, CA (US)

(72) Inventors: Luiz Andre Barroso, Los Altos Hills, CA (US); James Laudon, Madison, WI (US); Michael R. Marty, Madison, WI (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,319

(22) Filed: Jun. 6, 2016

Related U.S. Application Data

(63) Continuation of application No. 14/059,218, filed on Oct. 21, 2013, now Pat. No. 9,384,036.

(51) Int. Cl.
*G06F 9/44* (2018.01)
*G06F 9/45* (2006.01)
*G06F 9/48* (2006.01)
*G06F 12/0875* (2016.01)

(52) U.S. Cl.
CPC ........ *G06F 9/4825* (2013.01); *G06F 12/0875* (2013.01); *G06F 2212/45* (2013.01)

(58) Field of Classification Search
CPC .... G06F 9/461; G06F 9/3009; G06F 2212/45; G06F 12/0875; G06F 9/4825–9/4875
See application file for complete search history.

(56) References Cited

U.S. PATENT DOCUMENTS

| | | | | |
|---|---|---|---|---|
| 6,076,157 A * | 6/2000 | Borkenhagen | ........ | G06F 9/3851 712/228 |
| 7,617,499 B2 * | 11/2009 | Bradford | ............... | G06F 9/3802 718/108 |
| 7,783,757 B2 * | 8/2010 | Plamondon | ......... | H04L 67/2847 709/217 |
| 7,870,345 B2 * | 1/2011 | Daud | .................. | G06F 11/0709 711/147 |
| 8,151,095 B1 | 4/2012 | Wilt | | |
| 8,347,309 B2 * | 1/2013 | Smolens | ............... | G06F 9/5016 718/108 |

(Continued)

OTHER PUBLICATIONS

Rishi Kapoor, Chronos: Predictable Low Latency for Data Center Applications, 2012, pp. 1-14.*

(Continued)

*Primary Examiner* — S. Sough
*Assistant Examiner* — Mongbao Nguyen
(74) *Attorney, Agent, or Firm* — Fish & Richardson P.C.

(57) ABSTRACT

A method includes performing one or more operations as requested by a thread executing on a processor, the thread having a thread context; receiving a park request from the thread, the park request received following a request from the thread for a low latency resource, wherein the cache response time is less than or equal to a resource response threshold so as to allow the thread context to be stored and retrieved from the cache in less time than the portion of time it takes to complete the request for the low latency resource; storing the thread context in the cache; detecting that the resume condition has occurred; retrieving the thread context from the cache; and resuming execution of the thread.

17 Claims, 3 Drawing Sheets

(56) References Cited

U.S. PATENT DOCUMENTS

| | | | | |
|---|---|---|---|---|
| 8,701,010 | B2* | 4/2014 | Plamondon | G06F 12/0862 709/217 |
| 8,756,605 | B2* | 6/2014 | Aingaran | G06F 9/3842 718/103 |
| 8,904,154 | B2* | 12/2014 | Devadas | G06F 9/3824 712/225 |
| 9,086,973 | B2* | 7/2015 | Vorbach | G06F 9/526 |
| 2003/0163675 | A1 | 8/2003 | Bennett | |
| 2006/0095905 | A1* | 5/2006 | Courchesne | G06F 9/485 718/100 |
| 2007/0079301 | A1 | 4/2007 | Chinya | |
| 2007/0124729 | A1 | 5/2007 | Ko | |
| 2007/0124736 | A1 | 5/2007 | Gabor | |
| 2008/0010442 | A1 | 1/2008 | Hochschild | |
| 2008/0165800 | A1* | 7/2008 | Chen | G06F 9/526 370/465 |
| 2009/0049451 | A1 | 2/2009 | Bates | |
| 2009/0106495 | A1 | 4/2009 | Chou | |
| 2009/0199184 | A1 | 8/2009 | Arimilli | |
| 2010/0287319 | A1 | 11/2010 | Hill et al. | |
| 2011/0055838 | A1* | 3/2011 | Moyes | G06F 9/4881 718/102 |
| 2011/0209151 | A1 | 8/2011 | Chung et al. | |
| 2012/0047516 | A1 | 2/2012 | Barwick | |
| 2012/0290821 | A1* | 11/2012 | Shah | G06F 9/3806 712/240 |
| 2013/0297910 | A1* | 11/2013 | Smolens | G06F 9/3851 712/205 |
| 2014/0013333 | A1 | 1/2014 | Mishaeli | |
| 2014/0067905 | A1* | 3/2014 | Jansson | G06F 9/5033 709/202 |
| 2014/0075163 | A1 | 3/2014 | Loewenstein et al. | |
| 2014/0122844 | A1 | 5/2014 | Swanberg | |
| 2014/0181830 | A1 | 6/2014 | Naik | |
| 2014/0281380 | A1 | 9/2014 | Sodhi | |

OTHER PUBLICATIONS

L. Sawalha, Hardware thread-context switching, 2013, pp. 1-2.*
MIPS by Imagination, MIPS MT Principles of Operation, 2013, pp. 1-20.*
StackOverFlow, how can you measure the time spent in a context switch under java platform, 2011, pp. 1-3. https://stackoverflow.com/questions/6987394/how-can-you-measure-the-time-spent-in-a-context-switch-under-java-platform (Year: 2011).*
Jeffery A. Brown, Fast Thread Migration via Cache Working Set Prediction, 2011, pp. 193-204. https://ieeexplore.ieee.org/stamp/stamp.jsp?tp=&arnumber=5749728 (Year: 2011).*
Mark Gebhart, Energy-efficient Mechanisms for Managing Thread Context in Throughput Processors, 2011, pp. 1-11. http://www.cs.virginia.edu/~skadron/Papers/gebhart_isca11.pdf (Year: 2011).*
Hantak Kwak, Effects of Multithreading on Cache Performance, 1999, pp. 176-183. https://ieeexplore.ieee.org/stamp/stamp.jsp?tp=&arnumber=752659 (Year: 1999).*
Grunewald, Winfried, et al., "Towards Extremely Fast Context Switching in a Block-Multithreaded Processor," EUROMICRO 96, Beyond 2000: Hardware and Software Design Strategies, Proceedings of the 22nd EUROMICRO Conference, Sep. 1996, DD. 592-599, 8 pages.
Whitepaper, NVIDIA's Next Generation CUDA™ Compute Architecture: Fermi™, NVIDIA Corporation, 2009, 22 pages.
Strong, Richard, et al., "Fast Switching of Threads Between Cores," ACM SIGOPS Operating Systems Review, The Interaction Among the OS, the Compiler, and Multicore Processors, Apr. 2009, vol. 43, No. 2, 11 pages.
Smith, Burton J., "Architecture and Applications of the HEP Multiprocessor Computer System", Dataflow and Multithreading, Proceedings of the 4th International Conference on Supercomputing, Chapter 5, Published in 1990, pp. 342-349.
Laudon, James et al., "Interleaving: A Multithreading Technique Targeting Multiprocessors and Workstations", Nov. 1994, 11 pages.
"Multics History", http://www.multicians.org/history.html, Jun. 9, 2013, 16 pages.
Alverson, Robert et al., "The Tera Computer System", ACM, Copyright 1990, 6 pages.
Wikipedia, "Time-Sharing", last modified Oct. 16, 2013, 7 pages.
Tullsen, Dean M. et al., "Simultaneous Multithreading: Maximizing On-Chip Parallelism", Proceedings of the 22nd Annual Intl Symposium on Computer Architecture, Jun. 1995, 12 pages.
David Tam, Thread Clustering: Sharing-Aware Scheduling on SMP-CMP-SMT Multiprocessors, 2007, pp. 47-56.
Hantak Kwak, Effects of Multithreading on Cache Performance, 1999, pp. 1-9.
Mark Gebhart, Energy-efficient Mechanisms for Managing Thread Context in Throughput Processors, 2011, pp. 1-12.

* cited by examiner

LOW LATENCY THREAD CONTEXT CACHING

CROSS-REFERENCE TO RELATED APPLICATIONS

This application is a continuation application of, and claims priority to, U.S. patent application Ser. No. 14/059,218, titled "Low Latency Thread Context Caching," filed on Oct. 21, 2013. The disclosure of the foregoing application is incorporated herein by reference in its entirety for all purposes.

BACKGROUND

This specification relates to techniques allowing a processor to cache thread contexts while requests for low latency resources are pending.

Modern processors may include multiple independent processor cores. Each processor core may execute one or more threads at a time. Each thread may be associated with a thread context including a stack, a current instruction pointer, and other information used by the thread during execution. When execution of a thread is suspended so that another thread may be executed, a context switch occurs.

SUMMARY

The subject matter of this application relates to techniques allowing a processor to cache thread contexts while requests for low latency resources are pending.

In general, one innovative aspect of the subject matter described in this specification can be embodied in methods that include the actions of performing, by a processor core of the processor, one or more operations as requested by a thread executing on the processor, the thread having a thread context including information used by the thread during execution; receiving, by the processor core, a park request from the thread indicating that execution of the thread should be suspended and the thread context should be stored in a cache included in the processor and having a cache response time, the park request including a resume condition indicating when the thread should be resumed, the park request received following a request from the thread for a low latency resource, wherein the cache response time is less than or equal to a resource response threshold so as to allow the thread context to be stored and retrieved from the cache in less time than the portion of time it takes to complete the request for the low latency resource; storing the thread context in the cache; detecting that the resume condition has occurred; retrieving the thread context from the cache; and resuming execution of the thread on the processor core using the retrieved thread context.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By utilizing the techniques described herein, programmers may be presented with a simple blocking input output (TO) programming model without substantial context switch penalties even when communicating with fast IO devices. By reducing these context switch penalties, processor utilization may be improved, leading to greater overall performance. Further, as the techniques herein may be applied to threads waiting for IO operations to complete, lower IO latency may be realized through the use of these techniques.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Microprocessors use multiple threads of execution and thread switching in order to hide or tolerate long latency events. If a thread of execution of a program cannot proceed until an event external to the processing core completes (i.e., the thread is blocked) the system will suspend or "park" that thread and begin executing instructions from a different (unblocked) thread, resulting in much higher utilization of processing cores and faster programs overall.

Current CPU architectures and operating systems have implemented two classes of techniques to accomplish this. To tolerate short latency events (order of tens to few hundreds of nanoseconds), such as CPU cache misses to main memory, several microarchitectural techniques have been developed, including hardware multithreading. In hardware multithreading the processor cores themselves store the context for a small number of runnable threads from which instructions can be executed upon blocking of a given thread. In such implementations, the thread switching delays involved can be minimal (order of 1 nanosecond or less). To tolerate long latency events (order of 1 millisecond or more), the operating system can be invoked to stop a thread, save its context of execution in DRAM or disk, and restore the context of a new thread. These actions involve executing thousands of CPU instructions (or long running hardware sequences), and tend to pause execution for several microseconds (4-10 microseconds are typical), and correspond to accesses to disk or network communications in wide-area networks (WAN).

A class of events exist that have much higher latencies than DRAM accesses but much lower latencies than disk input output (TO) and typical WAN communications. For such events with latencies in the range of multiple microseconds and high event rates (millions of events per second), operating system thread switching techniques are far too slow.

Hardware-based latency tolerant techniques such has hardware multithreading can switch fast enough but are only capable of supporting a small number of thread contexts (less than 8 in reasonable implementations). Accordingly, IO intensive workloads are likely to run out of runnable threads rather quickly.

Therefore, support for large numbers of moderately fast switching threads is attractive. Increasing the number of hardware contexts simultaneously residing in a CPU core is very challenging since the state for such threads needs to be stored in very fast and very large structures. Reducing the overhead of operating systems thread switching is possible but the complexity of operating system code will limit how much faster it can become.

For modern processors to efficiently deal with these challenges they will need to support many more threads than can be reasonably implemented in traditional hardware multithreading schemes (such as simultaneous multithreading), while supporting thread switch delays that are much shorter than what operating systems can be expected to deliver. Accordingly, the present disclosure describes systems and methods for accomplishing this with modest additional hardware complexity and simple operating system support. The mechanism proposed here is targeted at operations with latencies ranging from a microsecond to many tens of microseconds. Such latencies are expected from remote direct memory access operations (RDMA), accesses to solid state storage devices (Flash, phase change memory, memristors, etc.), graphics processing units, co-processors, or other specialized computing acceleration units. Operations having latencies in these ranges are referred to herein as "fast TO" operations.

To tolerate event latencies on the order of a few microseconds, context switch times substantially less than that are necessary. For example, if a read operation is issued to a solid state device that will take two microseconds to respond, the overhead for switching out of the current thread of execution and back to it upon completion needs to between 1-5% of the event time. In other words, we need event switching times of about ten nanoseconds or less.

The present disclosure is implemented in a multi-core system in which each core can run a small number of independent software threads (e.g., one or more) using either simultaneous multithreading (e.g., hyperthreading) or block multithreading in which the core executes one or a few instructions per thread as a block, switching among threads every few cycles. In some implementations, fast TO operations block the issuing thread until the operation completes. This allows, for example, coding of the thread in a synchronous fashion rather than relying on more complicated asynchronous TO techniques. Because most CPUs support only a limited number of hardware threads, implementing a thread state parking cache on-die that can hold the state of at least a few tens of threads per physical CPU core (or alternatively reusing the processor's caches for such a state) facilitates the processing of more fast I/O operations than could be supported without the fast I/O thread park caching.

Accordingly, each core may be simultaneously executing instructions from a small subset of software threads that are loaded into the multiple hardware contexts available per core (as in hyperthreading), while having a much larger number of software threads parked with their context stored in the last level cache awaiting completion of fast IO operations. Upon completion of a fast IO operation, the associated parked thread may be enqueued in a ready queue that can be managed in software or hardware. Since the architectural state of CPUs is small, such suspension/resumption of threads can be accomplished in tens of processor cycles.

In some implementations, each parked thread also has an associated resumption register where the IO device that is the target of the fast IO operation can signal the completion (or failure) of the operation. For example, for fast IO operations that return only a completion code, that code may be directly stored in the resumption register. For operations that have more arbitrary return data, the data are passed through an arbitrary memory mapped region. In some implementations, fast IO capable devices may be able to directly inject such return data into the processor's cache for efficient communication.

These techniques may be particularly effective if the threads being switched are all part of the same application or address space. Large processor caches are typically physically tagged and translation lookaside buffers (TLBs) or other virtually tagged structures have address space identifiers, so flushing such shared state structures is not necessary between context switches. Accordingly, when switching between threads from the same address space, there is a greater possibility of sharing state in the caches, TLBs, and other structures, known as "constructive interference" between threads.

In some implementations, the number of threads that are allowed to be in the parked mode can be adjusted dynamically, if necessary, to match the rate and latency for a particular program or IO device.

Figure 1:
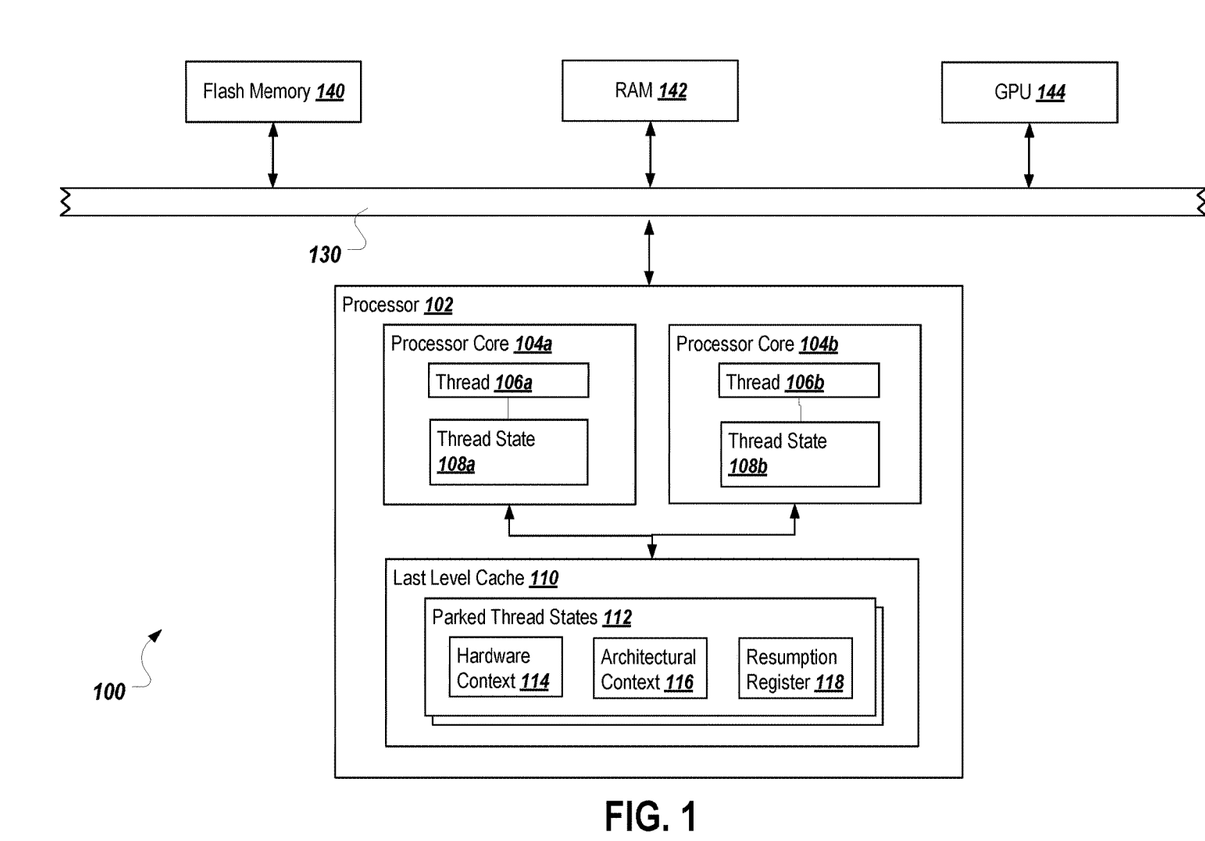
FIG. 1 is a block diagram of an environment in which the described thread context caching can occur.

FIG. 1 is a block diagram of an environment 100 in which the described thread context caching can occur. As shown, the environment 100 includes a processor 102 connected to a bus 130. The bus 130 communicatively couples the processor 102 to a set of external resources, including flash memory 140, random access memory (RAM) 142, and graphics processing unit (GPU) 144. The processor 102 includes a processor cores 104a-b operable to execute instructions provided by a currently running thread 106a-b associated with the processor core 104a-b. The processor 102 also includes the last level cache 110 that stores one or more parked thread states 112. Each part thread state 112 includes a hardware context 114, an architectural context 116, and a resumption register 118.

In operation, the processor 102 is operable to park threads 106a-b running on the processor cores 104a-b when the threads send requests to a low latency resource, such as flash memory 140, RAM 142, GPU 144, and/or other resources. "Parking" a thread involves storing the thread's current state into the last level cache 110 as one of the parked thread states 112. The park threads states 112 include (i) a hardware context 114 representing the current state of hardware associated with the thread; (ii) an architectural context 116 representing the state of various systems associated with thread (e.g., the operating system); and (iii) a resumption register 118 will indicate when the parked thread should be resumed.

For example, thread 106a running on processor core 104a issues a request to read data from flash memory 140. The processor core 104a sends the request over the bus 130 to the flash memory 140. After the request has been issued, the thread 106a issues a park request to the processor core 104a indicating that the thread 106a should be parked. In response to this request, the processor core 104a stores the thread state 108a, associated with the thread 106a to the last level cache 110 as one of the parked thread states 112. After a certain amount of time, the processor 102 receives a response from the flash memory 140 including the data associated with the read request sent by the thread 106a. Upon receiving this response, the processor 102 retrieves the parked thread state 112 from the last level cache 110, and loads thread 106a and thread state 108a onto processor core 104a. Processor core 104a then resumes execution of thread 106.

The processor 102 may be a single central processing unit (CPU) chip including multiple processor cores, storage resources, and other components. The processor 102 may also include firmware or microcode instructions stored in on-chip storage and operable to implement the techniques described herein. In some implementations, the instructions necessary to implement the techniques described herein may be implemented in silicon. The processor 102 may also include multiple processors, each processor including its own associated processor cores, storage resources, and/or other components.

The processor 102 is connected to the data bus 130. In some implementations, the data bus 130 may be a high-speed data transfer mechanism used to transmit data between components within the computing device chassis. The data bus 130 may be any type of bus capable of performing such data transfers, including, but not limited to, North Bridge, Accelerated Graphics Port (AGP), Peripheral Component Interconnect (PCI), PCI Express, Small Computer System Interface (SCSI), IEEE 1394 (FIREWIRE), Universal Serial Bus (USB), and/or other types of buses. In some implementations, the data bus 130 may be replaced by a communication infrastructure utilizing a topology other than a bus topology such as, for example, a star topology, a hub and spoke topology, a mesh topology, and/or other topologies.

A plurality of resources are connected to the data bus 130, including flash memory 140, RAM 142, and GPU 144. In some implementations, additional resources may be connected to the data bus 130, including, but not limited to, Direct Memory Access (DMA) controllers, graphics cards, network cards, RAID controllers, and/or other resources. In some cases, the resources 140, 142, 144, may be operable to receive requests from the processor 102 over the data bus 130, perform operations requested by the received requests, and respond to the receive requests over the data bus 130 if necessary.

As shown, the processor 102 includes multiple processor cores 104a-b. In some implementations, the processor cores 104a-b may be located on the same chip as the other components of the processor 102. The processor cores 104a-b may also be separate components connected by a data bus or bridge to the other components of the processor 102. Although two processor cores 104a-b are shown in FIG. 1, in some implementations, the processor 102 may include a single processor core, or may include more than two processor cores. In some implementations, the processor cores 104a-b may include other integrated components, such as, for example, dedicated cache memory such as L1 cache, hardware context storage, firmware storage, microcode storage, and/or other integrated components.

The processor cores 104a and 104b have instantiated within them threads 106a and 106b, respectively. In some implementations, the threads 106a-b may be sets of instructions executing on the processor cores 104a-b. For example, the thread 106a may be a software application executing on the processor 102. The thread 106a may also be one of many threads within a single software application that are executing on the processor 102. Each of the threads 106a-b is associated with a thread state 108a-b. The thread state 108a-b represents the current state of the executing thread, includes context information needed by the thread during execution. This context information may include an execution stack location associated with the thread (e.g., a pointer to a set of memory locations containing the thread's stack), a current instruction pointer associated with the thread, hardware states or interaction information associated with the thread, and/or any other context information.

The processor 102 also includes last level cache 110. The last level cache 110 may be any storage accessible by the processor cores 104a-b. In some implementations, the last level cache 110 may be on-chip cache associated with the processor 102, such that the processor cores 104a-b and the last level cache 110 are contained on the same chip.

In some implementations, the last level cache 100 may have a latency that is less than the latency of the resources 140, 142, 144 being accessed by the processor 102. Such a latency allows the thread states 108a-b to be stored and retrieved from the last level cache 110 while a request for one of the resources 140, 142, 144 is pending. For example, if the thread 106a requests that the GPU 144 perform an operation, the last level cache 110 may be fast enough that the thread state 108 a may be stored in the last level cache 110 and retrieved for the last level cache 110 in less time than it takes for a response to be received from the GPU 144. By utilizing a cache with these latency characteristics, the processor 102 may park threads that are waiting for responses from the resources 140, 142, 144, and allow other threads to make use of the processor cores 140a-b in the meantime. This leads to greater performance as the processor cores 140a-b will have fewer idle cycles, such as those spent waiting for response from the resources 140, 142, 144.

The last level cache 110 stores one or more parked thread states 112. Each parked thread states 112 represents the state of a thread at the moment it was parked. For example, if the thread 106a was parked, the parked thread state 112 associated with the thread 106a would contain information from the thread state 108a associated with the thread 106a.

The parked thread state 112 includes a hardware context 114. In some implementations, the hardware context 114 includes various information stored by the thread associated with the thread's interaction with hardware components within the computing device containing processor 102. For example, if the thread has been given a handle or identifier for use in interacting with hardware components, such an identifier would be stored within the hardware context 114. The hardware context 114 may also include a timeout value to serve as a watchdog timer for threads that do not get awaken for long periods of time. The hardware context 114 may also include a CPU id for a preferred processor core on which to resume execution. In some cases, the hardware context 114 may include an identifier specifying the kind of IO operation that caused suspension of this thread. The hardware context 114 may also include a time value indicating when the thread was parked. In some implementations, the hardware context 114 may include an address space identifier or process ID that indicates to which process or address space this particular thread belongs.

The parked thread state 112 also includes an architectural context 116. In some implementations, the architectural context 116 may include information about the thread needed by the processor cores 104a-b in order to execute the thread. Such information may to include an execution stack location, a current instruction pointer, register values, condition codes, control/status registers, thread-specific performance counters, and/or other information.

The parked thread state 112 also includes a resumption register 118. In some implementations, the resumption register 118 represents a location that, when written to, will cause the parked thread associated with the particular park thread state 112 to be resumed. For example, if a thread sends a request to read data from RAM 142, the resumption register 118 may be a register whose value will change when the request is complete, such as by the memory controller updating the value. In some implementations, the resumption register 118 may be a more complex structure, such as conditional logic to be executed to determine if the thread should be resumed. The conditional logic may be installable microcode. In some implementations, the resumption register 118 may be examined to implement prefetching behavior to move threads that are about to resume to a lower level cache (e.g., L1 cache) for quick access.

Figure 2:
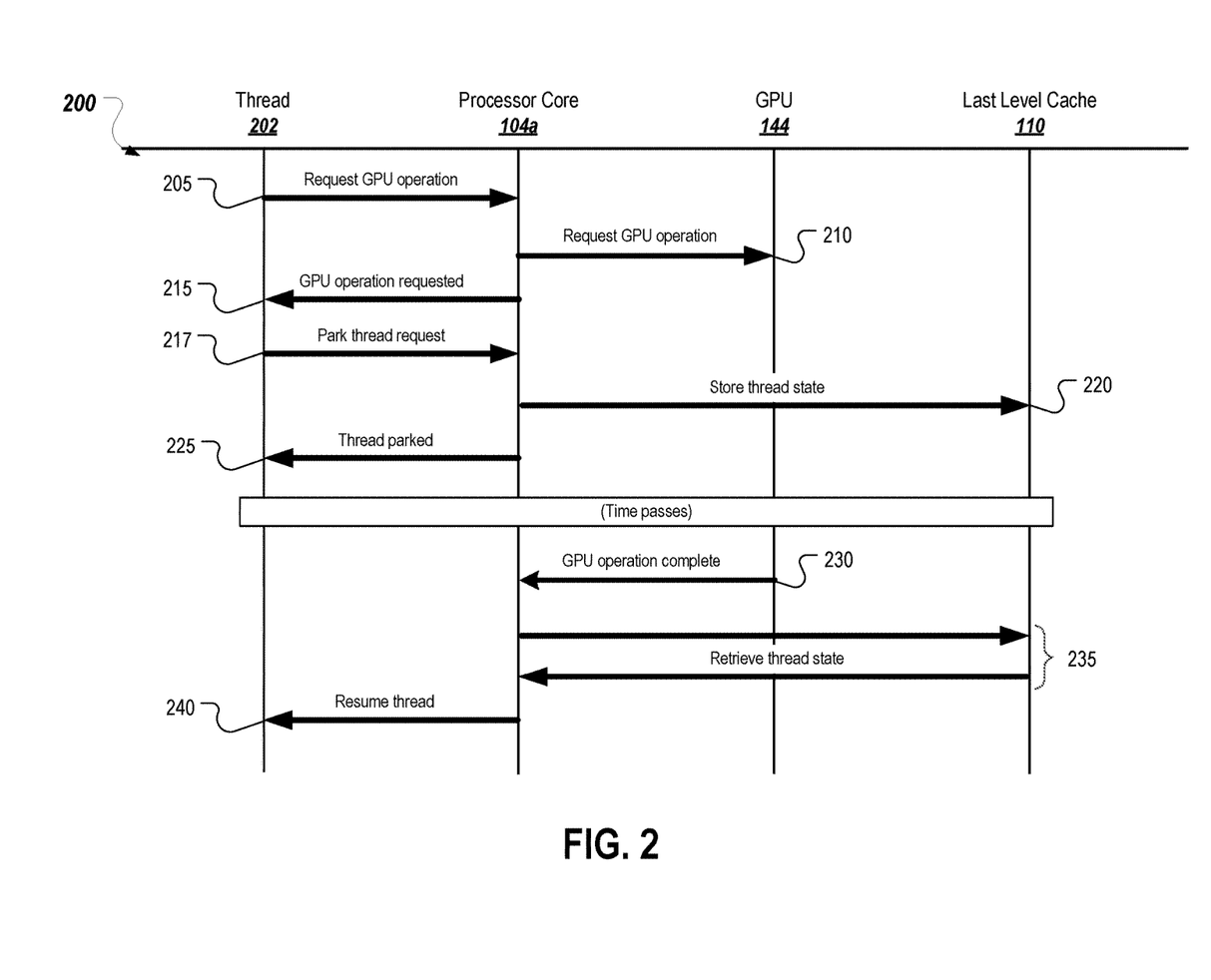
FIG. 2 is a message flow diagram of an example interaction between a thread, a processor core, a low latency resource (a GPU), and a cache in order to perform thread context caching.

FIG. 2 is a message flow diagram of an example interaction 200 between a thread 106a, a processor core 104a, a low latency resource (a GPU 144), and a last level cache 110 in order to perform thread context caching.

At 205, the thread 106a requests that the GPU 144 perform an operation. As the thread cannot interact directly with the GPU 144, the request is received by the processor core 104a. In some implementations, requesting the GPU operation may be performed by calling a function with the library provided by the manufacturer of the GPU 144. Calling this function may cause instructions to be executed by the processor core 104a to cause the request to be sent.

The processor core 104a sends the request to the GPU 144 at 210. At 215, the processor core 104a notifies the thread 106a that the GPU operation has been requested. Such notification may take the form of the status code being returned to the thread 106a, to a success flag, bit, or register being set, or any other form of notification.

At 217, the thread 106a sends a parked thread request to the processor core 104a. Such a parked thread request may be initiated by the thread itself, such as in response to the GPU operation being requested successfully. In some implementations, the parked thread request may be initiated by the author of the thread inserting a call to a function to park the thread within the code of the thread itself. In some cases, the processor core 104a or the processor 102 may automatically detect that the request to GPU operation is one which should cause the thread 106a to be parked. In such a case, the processor core 104a or the processor 102 may initiate the thread parking process, and the parked thread request at 217 may be omitted.

At 210, the processor core 104a stores the thread state associated with the thread 106a in response to the parked thread request at 217. The thread state associated with the thread 106a is stored in the last level cache 110. In some implementations, the processor core 104a may retrieve another thread state from the last level cache 110 or from another location, and begin executing the newly retrieved thread after successful storage of the thread state associated with thread 106a. By doing this, the processor core 104a may execute instructions for a different thread while the GPU 144 is processing the operation requested by thread 106a, as opposed to thread 106a sitting idle on the processor core 104a while waiting for the response from the GPU 144.

After an amount of time, most likely on the order of microseconds, the GPU 144 sends indication to the processor core 104a the operation has completed at 230. In response, the processor core 104a retrieves the thread state associated with the thread 106a from the last level cache 110. If another thread is executing on processor core 104a, the processor core may suspend execution of that thread, in order to resume execution of the thread 106a at 240. In some implementations, the processor core 104a may delay the retrieval of the thread state at 235 and the resumption of the thread 106a at 240 until another thread running on the processor core 104a reaches a point of execution during which it can be preempted.

Figure 3:
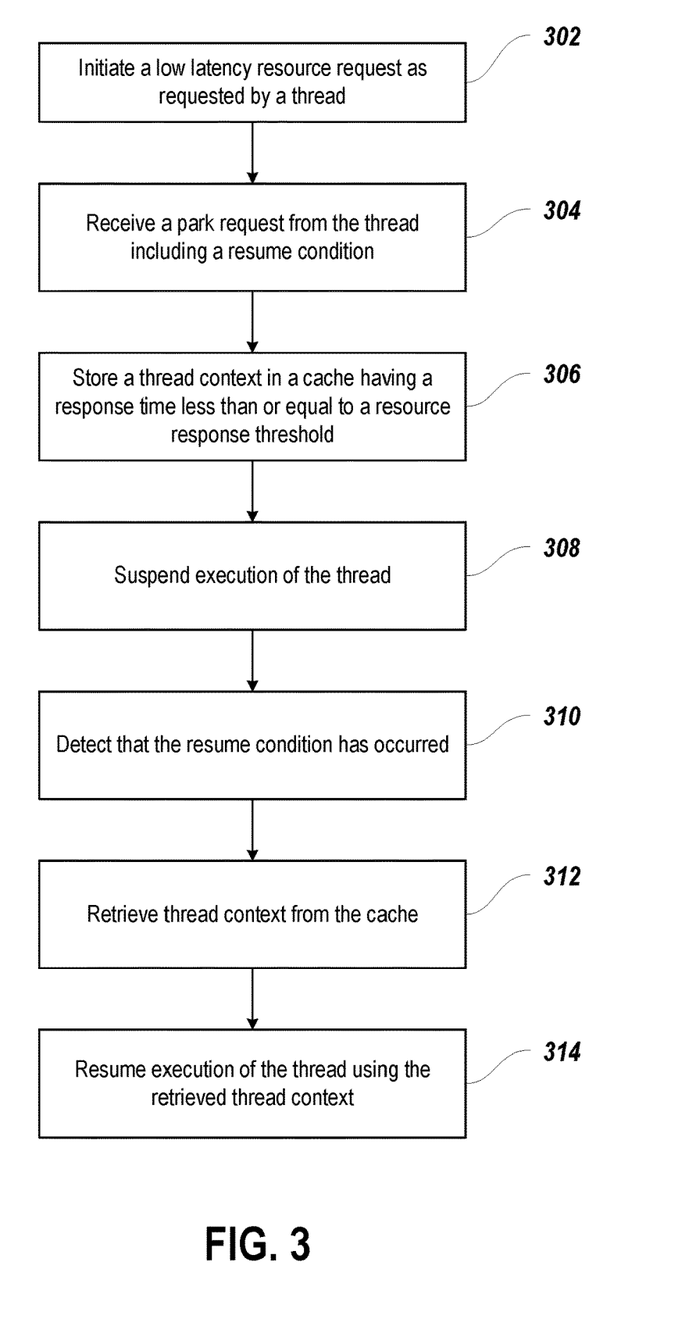
FIG. 3 is a flow diagram of an example process for caching thread contexts while requests for low latency resources are pending.

FIG. 3 is a flow diagram of an example process 300 for caching thread contexts while requests for low latency resources are pending. The process 300 may be performed by the processor 102 described in FIG. 1.

The processor 102 initiates a low latency resource request as requested by a thread (302). In some implementations, the processor 102 may send a request to the low latency resource over a data bus. In some cases, the low latency resource may be flash memory, RAM, a GPU, a co-processor, a DMA controller, and/or other resources.

The processor 102 receives a park request from the thread including a resume condition (304). In some implementations, the resume condition may include a resumption register that, when updated, will cause the thread to be resumed. The resumption condition may also include a conditional statement or instructions that, when true, will cause the thread to be resumed. In such a case, the processor 102 may periodically check for the occurrence of the resume condition.

In response to the park request, the processor 102 stores a thread context in a cache having a response time less than or equal to a resource response threshold (306). In some implementations, the cache having a response time less than or equal to a resource response threshold is the last level cache 110. In some cases, the resource response threshold is between 1 microsecond and 100 microseconds. In some implementations, storing the thread context in the cache includes storing at least one of: a stack location associated with the thread, a current instruction pointer associated with the thread, an execution register state associated with the thread, a pointer to a set of higher level cache entries associated with the thread, or a pointer to a set of translation lookaside buffer entries associated with the thread. In some implementations, the resource response threshold has a value that is less than 5% of a resource response time of the low latency resource.

The processor 102 suspends execution of the thread (308). In some cases, suspending execution of the threat includes loading a different thread context for a different thread and beginning execution of that thread.

The processor 102 detects that the resume condition has occurred (310). In some implementations, detecting the resume condition includes detecting that the value of a resumption register is changed. Detecting the resume condition has occurred may also include detecting that the conditional statement supplied with the park request now evaluates to true.

The processor 102 retrieves the thread context from the cache (312). In some implementations, the processor 102 may retrieve the thread context from the last level cache 110. In some cases the thread context retrieved may include an execution stack location, register values, a current instruction pointer, and/or other context information used by the processor 102 to execute the thread.

The processor 102 resumes execution of the thread using the retrieved thread context (314). In some implementations, resuming execution includes preempting the currently executing thread on the processor 102, storing the thread context associated with that thread, and loading the retrieved thread context onto the processor 102 in order to continue execution.

The method of claim 1, wherein the request from the thread for the low latency resources includes at least one of: a store operation, a load operation, or a mathematical operation.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by a processor, the method comprising:
    performing, by a processor core of the processor, one or more operations as requested by a thread executing on the processor, the thread having a thread context including information used by the thread during execution;
    receiving, by the processor core, a park request from the thread indicating that execution of the thread should be suspended and the thread context should be stored in a cache included in the processor core and having a cache response time, the park request including a resume condition indicating when the thread should be resumed, the park request received following a request from the thread for a low latency resource to perform an operation for which the cache response time is less than or equal to a response time threshold so as to allow the thread context to be stored and retrieved from the cache in less time than a time it takes the low latency resource to complete the operation;
    storing the thread context in the cache;
    detecting that the resume condition has occurred, wherein detecting that the resume condition has occurred includes detecting that a value of a resume register has been updated;
    retrieving the thread context from the cache; and
    resuming execution of the thread on the processor core using the retrieved thread context.

2. The method of claim 1, wherein the request from the thread for the operation includes at least one of: a store operation, a load operation, or a mathematical operation.

3. The method of claim 2, wherein the operation is performed using one of: flash memory, random access memory (RAM), a co-processor, a graphics processing unit (GPU), a network interface controller (NIC), or a local-area network (LAN).

4. The method of claim 1, wherein detecting that the resume condition has occurred includes detecting that a memory location has been updated.

5. The method of claim 1, wherein storing the thread context in the cache includes storing at least one of: a stack location associated with the thread, a current instruction pointer associated with the thread, an execution register state associated with the thread, a pointer to a set of higher level cache entries associated with the thread, or a pointer to a set of translation lookaside buffer entries associated with the thread.

6. The method of claim 1, wherein the response time for the operation is between 100 nanoseconds and 100 microseconds.

7. A system comprising:
    memory for storing data; and
    a processor operable to perform operations comprising:
    performing, by a processor core of the processor, one or more operations as requested by a thread executing on the processor, the thread having a thread context including information used by the thread during execution;
    receiving, by the processor core, a park request from the thread indicating that execution of the thread should be suspended and the thread context should be stored in a cache included in the processor core and having a cache response time, the park request including a resume condition indicating when the thread should be resumed, the park request received following a request from the thread for a low latency resource to perform an operation for which the cache response time is less than or equal to a response time threshold so as to allow the thread context to be stored and retrieved from the cache in less time than a time it takes the low latency resource to complete the operation;
    storing the thread context in the cache;
    detecting that the resume condition has occurred, wherein detecting that the resume condition has occurred includes detecting that a value of a resume register has been updated;
    retrieving the thread context from the cache; and
    resuming execution of the thread on the processor core using the retrieved thread context.

8. The system of claim 7, wherein the request from the thread for the operation includes at least one of: a store operation, a load operation, or a mathematical operation.

9. The system of claim 8, wherein the operation is performed using one of: flash memory, random access memory (RAM), a co-processor, a graphics processing unit (GPU), a network interface controller (NIC), or a local-area network (LAN).

10. The system of claim 7, wherein detecting that the resume condition has occurred includes detecting that a memory location has been updated.

11. The system of claim 7, wherein storing the thread context in the cache includes storing at least one of: a stack location associated with the thread, a current instruction pointer associated with the thread, an execution register state associated with the thread, a pointer to a set of higher level cache entries associated with the thread, or a pointer to a set of translation lookaside buffer entries associated with the thread.

12. The system of claim 7, wherein the response time for the operation is between 100 nanoseconds and 100 microseconds.

13. A non-transitory, computer-readable medium storing instructions operable when executed to cause a processor to perform operations comprising:
    performing, by a processor core of the processor, one or more operations as requested by a thread executing on the processor, the thread having a thread context including information used by the thread during execution;
    receiving, by the processor core, a park request from the thread indicating that execution of the thread should be suspended and the thread context should be stored in a cache included in the processor core and having a cache response time, the park request including a resume condition indicating when the thread should be resumed, the park request received following a request from the thread for a low latency resource to perform an operation for which the cache response time is less than or equal to a response time threshold so as to allow the thread context to be stored and retrieved from the cache in less time than a time it takes the low latency resource to complete the operation;
    storing the thread context in the cache;
    detecting that the resume condition has occurred, wherein detecting that the resume condition has occurred includes detecting that a value of a resume register has been updated;
    retrieving the thread context from the cache; and
    resuming execution of the thread on the processor core using the retrieved thread context.

14. The non-transitory, computer-readable medium of claim 13, wherein the request from the thread for the operation includes at least one of: a store operation, a load operation, or a mathematical operation.

15. The non-transitory, computer-readable medium of claim 14, wherein the operation is performed using one of: flash memory, random access memory (RAM), a co-processor, a graphics processing unit (GPU), a network interface controller (NIC), or a local-area network (LAN).

16. The non-transitory, computer-readable medium of claim 13, wherein detecting that the resume condition has occurred includes detecting that a memory location has been updated.

17. The non-transitory, computer-readable medium of claim 13, wherein storing the thread context in the cache includes storing at least one of: a stack location associated with the thread, a current instruction pointer associated with the thread, an execution register state associated with the thread, a pointer to a set of higher level cache entries associated with the thread, or a pointer to a set of translation lookaside buffer entries associated with the thread.

* * * * *